(12) United States Patent
Parker, Jr.

(10) Patent No.: US 7,521,484 B2
(45) Date of Patent: Apr. 21, 2009

(54) MIXED BED ION EXCHANGE RESINS

(75) Inventor: Garth Rockwood Parker, Jr., Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 907 days.

(21) Appl. No.: 10/224,712

(22) Filed: Aug. 21, 2002

(65) Prior Publication Data

US 2004/0039070 A1 Feb. 26, 2004

Related U.S. Application Data

(60) Provisional application No. 60/318,145, filed on Sep. 7, 2001.

(51) Int. Cl.
*B01J 49/00* (2006.01)
*C08C 2/04* (2006.01)

(52) U.S. Cl. .......................................... 521/28; 528/482

(58) Field of Classification Search ................... 521/28; 528/482; 525/332.3, 332.9, 333.3, 343
See application file for complete search history.

(56) References Cited

U.S. PATENT DOCUMENTS

| | | | |
|---|---|---|---|
| 2,961,417 A * | 11/1960 | Small | |
| 3,168,486 A * | 2/1965 | Small | |
| 4,347,328 A | 8/1982 | Harmon et al. ................ 521/28 |
| 4,511,677 A | 4/1985 | Horton et al. .................. 521/28 |
| 5,382,610 A * | 1/1995 | Harada ......................... 524/35 |
| 5,902,833 A * | 5/1999 | Tasaki .......................... 521/28 |
| 5,985,944 A * | 11/1999 | Ishizaki ........................ 521/64 |
| 6,060,526 A * | 5/2000 | Tasaki .......................... 521/28 |
| 6,306,815 B1 * | 10/2001 | Rodrigues et al. ........... 510/475 |

\* cited by examiner

*Primary Examiner*—William K Cheung
(74) *Attorney, Agent, or Firm*—Tiffani M. Cottingham

(57) ABSTRACT

The present invention relates to a non-agglomerating, readily separable mixed bed ion exchange system comprising:
(a) a strong base quaternary ammonium anion exchange resin wherein said anion exchange resin has been pretreated with 10 to 800 milligrams of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
(b) a strong acid sulfonated cation exchange resin wherein said cation exchange resin has been pretreated with 10 to 800 milligrams of a water soluble cationic polyelectrolyte selected from the group of polymers consisting of poly(vinylaromatic)quaternary amine salts, poly(vinylaromatic)tertiary amine acid salts, or poly(vinylpyridines) acid salts, wherein the number average molecular weight of said polymers is from 5,000 to 1,000,000.

5 Claims, No Drawings

MIXED BED ION EXCHANGE RESINS

CROSS REFERNCE TO RELATED PATENT APPLICATIONS

This is a non-provisional application of prior pending U.S. provisional application Ser. No. 60/318,145 filed Sep. 7, 2001.

BACKGROUND

This invention relates to non-agglomerating, readily separable mixed bed ion exchange resin systems. More particularly it concerns a method for neutralizing both the surface charges of the anion exchanging component and the cation exchanging component of the mixed bed system by treatment with an anionic polyelectrolyte and a cationic polyelectrolyte.

The use of mixed bed ion exchange resins for deionization of aqueous solutions is widespread. Effective regeneration of mixed bed ion exchange resins is the key to their successful use, and the separation of the two components is the critical step. Surface interactions between the cationic and anionic resin particles cause clumps or agglomerates of resin to form that lead to poor flow distribution in the bed and hence inefficient operation. Further, during the backwash operation, when it is desirable to separate the cationic and anionic resins into layers, said separation is poor. The art has discovered ways to overcome this undesirable agglomeration by treatment with water-insoluble crosslinked ion exchange emulsion particles (U.S. Pat. No. 4,347,328), and treatment with water-soluble resinous polyelectrolytes to neutralize the surface charges of the treated resins (U.S. Pat. No. 2,961,417 and U.S. Pat. No. 3,168,486). Treatment with insoluble ion exchange emulsion particles (U.S. Pat. No. 4,347,328) involves high usage levels and extensive washing of the treated resin to remove the emulsion particles. Further, mixed bed resins prepared using Tasaki's approach (U.S. Pat. No. 5,902,833 and U.S. Pat. No. 6,060,526) are essentially non-agglomerating without affecting the kinetics of the anion exchange resin component.

The art has demonstrated lack of agglomeration in the sense that the volume of the mixed bed resin is comparable to the sum of the volumes of the individual components. However, lack of agglomeration does not guarantee good separation of anion and cation resins when these mixed bed resins are backwashed prior to separation and regeneration. A type of weak agglomeration is sometimes observed that does not affect the volume of the mixed bed resin. Specifically, loose agglomerates of anion and cation exchange beads are formed. These loose agglomerates are not broken apart during the backwash step and tend to reside in the cation resin layer when the bed is settled after backwashing. External visual observation does not show the presence of these agglomerates in the settled bed. Rather, the volume of the "cation" resin layer is substantially larger, and the volume of the anion resin layer is substantially less, than the volume of the corresponding resins originally charged. The presence of anion resin in the cation resin layer leads to extremely poor regeneration results and poor mixed bed performance on subsequent cycles. It is known to those skilled in the art that the presence of as little as 1% cross contamination can result in a severe deterioration of performance of said mixed bed on subsequent cycles such that the purity of the water produced is unacceptable. For example, water purity is especially important in the semiconductor industry where the extent of miniaturization depends on ultra pure water.

The present invention overcomes the problems of the prior art by providing a composition for and process for preparing non-agglomerating, readily separable mixed bed ion exchange systems.

SUMMARY OF THE INVENTION

The present invention relates to a non-agglomerating, readily separable mixed bed ion exchange system comprising:
(a) a strong base quaternary ammonium anion exchange resin wherein said anion exchange resin has been pretreated with 10 to 800 milligrams of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
(b) a strong acid sulfonated cation exchange resin wherein said cation exchange resin has been pretreated with 10 to 800 milligrams of a water soluble cationic polyelectrolyte selected from the group of polymers consisting of poly(vinylaromatic)quaternary amine salts, poly(vinylaromatic)tertiary amine acid salts, or poly(vinylpyridines) acid salts; wherein the number average molecular weight of said polymers is from 5,000 to 1,000,000.

The present invention further relates to a non-agglomerating, readily separable mixed bed ion exchange system comprising:
(a) a strong base quaternary ammonium anion exchange resin wherein said anion exchange resin has been pretreated with 10 to 800 milligram of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
(b) a strong acid sulfonated cation exchange resin wherein said cation exchange resin has been pretreated with 10 to 800 milligrams of a water soluble cationic polyelectrolyte selected from the group of polymers consisting of poly(vinylaromatic)quaternary amine salts, poly(vinylaromatic)tertiary amine acid salts, or poly(vinylpyridines) acid salts; wherein the number average molecular weight of said polymers is from 5,000 to 1,000,000.
(c) further provided that said system is separable to the extent that 0-5% of either the cation or anion exchange resin or a mixture of both remains unseparated.

The present invention also relates to a method for preparing strong base anion exchange resins and strong acid cation exchange resins for use in mixed bed ion exchange systems containing strong base anion exchange resins and strong acid cation exchange resins comprising the steps of:
(a) contacting said anion exchange resin with an effective amount of water-soluble sulfonated poly(vinylaromatic) polyelectrolyte wherein the amount of sulfonated poly (vinylaromatic)polyelectrolyte is from 10 to 800 milligrams per liter of anion exchange resins and the number average molecular weight of the sulfonated poly(vinylaromatic)polyelectrolyte is from 5,000 to 1,000,000;
(b) contacting said cation exchange resin with an effective amount a water soluble cationic polyelectrolyte selected from the group of polymers consisting of poly(vinylaromatic)quaternary amine salts, poly(vinylaromatic)tertiary amine acid salts, or poly(vinylpyridines) acid salts, wherein the amount of polymer is from 10 to 800 milligram per liter of cation exchange resin and the number average molecular weight of said polymer is from 5,000 to 1,000,000, wherein further said method provides a non-agglomerating, readily separable mixed bed ion exchange system.

DETAILED DESCRIPTION OF THE INVENTION

The present invention relates to a non-agglomerating, readily separable mixed bed ion exchange system comprising:
 (a) a strong base quaternary ammonium anion exchange resin wherein said anion exchange resin has been pretreated with 10 to 800 milligrams of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
 (b) a strong acid sulfonated cation exchange resin wherein said cation exchange resin has been pretreated with 10 to 800 milligrams of a water soluble cationic polyelectrolyte selected from the group of polymers consisting of poly(vinylaromatic)quaternary amine salts, poly(vinylaromatic)tertiary amine acid salts, or poly(vinylpyridines) acid salts, wherein the number average molecular weight of said polymers is from 5,000 to 1,000,000.

The present invention further relates to a non-agglomerating, readily separable mixed bed ion exchange system comprising:
 (a) a strong base quaternary ammonium anion exchange resin wherein said anion exchange resin has been pretreated with 10 to 800 milligram of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
 (b) a strong acid sulfonated cation exchange resin wherein said cation exchange resin has been pretreated with 10 to 800 milligrams of a water soluble cationic polyelectrolyte selected from the group of polymers consisting of poly(vinylaromatic)quaternary amine salts, poly(vinylaromatic)tertiary amine acid salts, or poly(vinylpyridines) acid salts; wherein the number average molecular weight of said polymers is from 5,000 to 1,000,000.
 (c) further provided that said system is separable to the extent that 0-5% of either the cation or anion exchange resin or a mixture of both remains unseparated.

The present invention also relates to a method for preparing strong base anion exchange resins and strong acid cation exchange resins for use in mixed bed ion exchange systems containing strong base anion exchange resins and strong acid cation exchange resins comprising the steps of:
 (a) contacting said anion exchange resin with an effective amount of water-soluble sulfonated poly(vinylaromatic) polyelectrolyte wherein the amount of sulfonated poly (vinylaromatic)polyelectrolyte is from 10 to 800 milligrams per liter of anion exchange resins and the number average molecular weight of the sulfonated poly(vinylaromatic)polyelectrolyte is from 5,000 to 1,000,000;
 (b) contacting said cation exchange resin with an effective amount a water soluble cationic polyelectrolyte selected from the group of polymers consisting of poly(vinylaromatic)quaternary amine salts, poly(vinylaromatic)tertiary amine acid salts, or poly(vinylpyridines) acid salts; wherein the amount of polymer is from 10 to 800 milligram per liter of cation exchange resin and the number average molecular weight of said polymer is from 5,000 to 1,000,000, wherein further said method provides a non-agglomerating, readily separable mixed bed ion exchange system.

The water soluble anionic polyelectrolyte useful in the present invention is a water soluble sulfonated poly(vinylaromatic)polyelectrolyte. The sulfonated poly(vinylaromatic) polyelectrolytes may be used either in the free acid form or in any of the water soluble salt forms, for example, the sodium, potassium or ammonium salts. Preferably the sulfonated poly (vinylaromatic)polyelectrolyte is sulfonated polystyrene. The polyelectrolytes useful in the present invention are water soluble and therefore contain substantially no crosslinker. The water soluble anionic polyelectrolytes useful in the practice of the present invention have number average molecular weights ($M_n$) ranging from 5,000 to 1,000,000, preferably from 10,000 to 500,000, more preferably from 10,000 to 100,000, and most preferably from 15,000 to 50,000. Number average molecular weights are based on aqueous phase gel permeation chromatography (GPC) using appropriate molecular weight standards.

Suitable water-soluble cationic polyelectrolytes useful in the present invention are selected from the group consisting of poly(vinylaromatic)quaternary amine salts, poly(vinylaromatic)tertiary amine acid salts, or poly(vinylpyridine) acid salts. Preferably the poly(vinylaromatic)quaternary amine salt is a polystyrene quaternary amine salt, more preferably a polyvinylbenzyl quaternary amine salt, and most preferably polyvinylbenzyltrimethylammonium chloride. Preferably the poly(vinylaromatic)tertiary amine acid salt is a polystyrene tertiary amine acid salt, more preferably a polyvinylbenzyl tertiary amine acid salt, and most preferably an polyvinylbenzyldimethylamine acid salt, wherein the acid is any of the inorganic acids including, but not limited to, hydrochloric acid or sulfuric acid. Preferably the poly(vinylpyridine) acid salt uses any of the inorganic acids including, but not limited to, hydrochloric acid or sulfuric acid. The watersoluble cationic polyelectrolytes useful in the practice of the present invention have number average molecular weights (Mn) of 5,000 to 1,000,000, preferably 10,000 to 500,000, more preferably 10,000 to 100,000, and most preferably 10,000 to 50,000. Number average molecular weights are based on aqueous phase gel permeation chromatography using appropriate molecular weight standards.

The term "ion exchange resin" is used conventionally herein and refers generally to weak and strong acid cation exchange resins and weak and strong base anion exchange resins of either the gel or macroporous type. Cation exchange resins and anion exchange resins (hereinafter generally referred to as cation resins and anion resins) are well known in the art and reference is made thereto for the purpose of this invention.

Typically, the ion exchange resins employed herein are prepared as spheroidal polymer beads having a volume average particle size from about 0.15 to about 1.0 millimeters (mm) and preferably from about 0.3 to about 0.7 mm, corresponding to 18 to 100 and 20 to 50 mesh (U.S. standard screen size), respectively. Of particular interest are the strong acid cation resins and the strong base anion resins, preferably those resins derived from monovinylidene aromatic monomers, such as styrene or monoalkyl substituted styrene, for example, vinyltoluene, and a copolymerizable crosslinking agent. Preferred crosslinking agents include, for example, the di- or polyvinylidene aromatics, such a divinylbenzene and divinyltoluene, and ethylene glycol dimethacrylate. Particularly preferred strong acid cation resins are the sulfonated copolymers of a monovinylidene aromatic and a copolymerizable crosslinking agent. Particularly preferred strong base anion resins are the crosslinked polymers of a monovinylidene aromatic bearing quaternary ammonium groups. In the preferred cation and anion resins, the monovinylidene aromatic is preferably styrene and the crosslinking agent is preferably divinylbenzene. Among the representative commercial cation exchange resins that are suitable for use in mixed bed systems of the present invention are, for example, Amberlite® IR120, Amberjet® 1500, and Ambersep® 200. Among the representative commercial anion exchange resins that are suitable for treatment by the process of the present invention are, for example, Amberlite® IRA402, Amberjet® 4400, and Ambersep® 900. Amberlite®, Amberjet® and Ambersep® are trademarks of Rohm and Haas Company, Philadelphia, Pa., USA.

According to the present invention, the anion resin being treated is contacted with sufficient amounts of the anionic polyelectrolyte to reduce the surface charge exhibited by the anion resin bead, that is, a neutralizing amount. By the term "reduce the surface charge" it is meant that the surface charge of the anion resin bead treated with the sulfonated poly(vinylaromatic)polyelectrolyte is reduced when compared to the surface charge of an anion resin that has not been treated. The reduction in surface charge of the treated anion resin is indicated by the reduction in the agglomeration (clumping) between the treated anion resin and the treated cation resin.

According to the present invention, the cation resin being treated is contacted with sufficient amounts of the cationic polyelectrolyte to reduce the surface charge exhibited by the cation resin bead, that is, a neutralizing amount. By the term "reduce the surface charge" it is meant that the surface charge of the cation resin bead treated with the cationic polyelectrolyte is reduced when compared to the surface charge of a cation resin that has not been treated. The reduction in surface charge of the treated cation resin is indicated by the reduction in the agglomeration (clumping) between the treated cation resin and the treated anion resin.

Agglomeration is readily measured using conventional techniques known to those skilled in the art. For example, known volumes of cation and anion exchange resin are mixed together, the mixed bed resin is allowed to settle, and the volume of the mixed bed resin is measured. Agglomeration is indicated by an increase in volume of the mixed bed resin compared to the sum of the volumes of the cation and anion resin components.

The separability of the mixed bed resin is readily measured using conventional techniques known to those skilled in the art. For example, known volumes of cation and anion exchange resins are mixed together. The mixed bed is then introduced into a backwash column and water is introduced at the base of the column with sufficient flow rate to cause the mixed bed resin to expand to typically twice the initial height. Typically, the resin components will separate, with the anion exchange resin forming a layer at the top and the cation exchange resin forming a layer at the bottom. After a period of time, the flow rate of water is decreased to 0 and the resin allowed to settle. The volume of each layer is measured and compared to the volume initially charged for each component. In the mixed bed system of the present invention, said system is separable to the extent that 0 to 5% of either the cation or anion exchange resin or a mixture of both remains unseparated. More preferably, 0 to 3% remains unseparated. Most preferably, 0 to 1% remains unseparated.

The present invention is prepared according to the following non-limiting examples:

EXAMPLE 1

The strong base anion exchange resin to be treated was obtained in the hydroxide form. 400 ml of this resin was charged to a backwash column and covered with deionized water. The required amount of sodium polystyrene sulfonate was added to the backwash column while agitating and mixing with nitrogen gas flow over a period of 30 min. After and additional 60 min of mixing, the nitrogen flow was turned off and the resin rinsed with 4 bed volumes of additional deionized water over a two hour period.

The strong acid cation exchange resin to be treated was obtained in the hydrogen form. 350 ml of resin was charged to a backwash column and covered with deionized water. The polyelectrolyte was poly(4-vinylpyridine) with a number average molecular weight of 14000, dissolved in 0.01 N sulfuric acid. The required amount of the hydrogen poly(4-vinylpyridine)sulfate was added to the backwash column while agitating and mixing with nitrogen gas flow over a period of 30 min. After an additional 60 min minutes of mixing, the nitrogen flow was turned off and the resin rinsed with 4 bed volumes of additional deionized water over a two hour period.

To check agglomeration, the following procedure was followed. 25 ml of strong base anion resin was measured out using a graduated cylinder, the volume measured tapped and settled under water. 25 ml of strong acid cation resin was measured out using a graduated cylinder, the volume measured tapped and settled under water. The two resins were combined in a 100 ml graduated cylinder equipped with a glass stopper. The cylinder was inverted 5 times, then the mixed resin allowed to settle and the total volume recorded. The graduated cylinder was tapped until no further settling occurred and the total volume recorded. Any increase in volume from the 50 ml charged is due to agglomeration.

To check separability, the following procedure was followed. This procedure simulates the manufacture of a mixed bed ion exchange resin, the initial use of said mixed bed resin in a ultrapure water facility, and the subsequent resin separation by backwash. 192 ml of strong base anion resin was measured out using a graduated cylinder, the volume measured tapped and settled under water. 128 ml of strong acid cation resin was measured out using a graduated cylinder, the volume measured tapped and settled under water. The two resins were charged to a glass column with a diameter of 2 in. The resins were mixed with nitrogen gas at a flow rate of 4 liter/min for period of 30 min. The mixed bed resin was then charged to glass column with a diameter of 2.4 cm. Ultrapure water (resistivity of 18.2 MΩ·cm, total organic carbon of 2 ppb) was pumped through the resin for period of 7 hr. The resin sat undisturbed in the column overnight (16 hr). The mixed bed resin was then transferred to a glass backwash column with a diameter of 2 in. The mixed bed resin was backwashed with room temperature deionized water at a sufficient rate to double the bed height for a period of 10 min. The flow rate was then slowly decreased to 0 over a period of 1 min. The water was drained out the bottom of the column at a rate of approximately 100 ml/min until the water level was just above the resin bed. The height above the column base of the interface between the cation and anion resin layers was recorded, as well as the total bed length. The volume percentage of the anion and cation layers was then calculated. Perfect separation would give an anion layer volume percentage of 60% by this test.

For this first example, four resin pairs were evaluated: untreated anion resin with untreated cation resin, treated anion resin with untreated cation resin, untreated anion resin with treated cation resin, and treated anion resin with treated cation resin. The following results were obtained by the agglomeration and separability tests. The treatment dose for the anion resin was 66 mg of anionic polyelectolyte per liter of resin. The treatment dose for the cation resin was 100 mg of cationic polyelectolyte per liter of resin.

TABLE 1

| Run | Anion Resin | Cation Resin | Agglomeration Test (Total volume, ml) | Separability Test (Anion layer, volume %) |
|---|---|---|---|---|
| 1 | Untreated | Untreated | >100 | 0 |
| 2 | Treated | Untreated | 50 | 53 |
| 3 | Untreated | Treated | 50 | 55 |
| 4 | Treated | Treated | 50 | 60 |
| Target | | | 50 | 60 |

In Table 1, a comparison of results from runs 2, 3, and 4 indicates that there was no difference in resin agglomeration; however, there was a difference observed in the separability test. Thus, a lack of agglomeration is not sufficient to ensure perfect separation. A comparison of results from runs 1, 2 and 3 indicates that treating either the anion resin or the cation resin can improve the mixed bed separability; however, as seen in run 4, only by treating both the anion and the cation resins was it possible to get perfect separability.

EXAMPLE 2

In this example the anion exchange resin was prepared the same as in example 1. The cation exchange resin was treated with poly(2-vinylpyridine) with a number average molecular weight of 8600, dissolved in 0.01 N hydrochloric acid.

TABLE 2

| Run | Anion Resin | Cation Resin | Separability Test (Anion layer volume %) |
|---|---|---|---|
| 1 | Untreated | Untreated | 24 |
| 2 | Treated | Untreated | 55 |
| 3 | Untreated | Treated | 57 |
| 4 | Treated | Treated | 60 |

In Table 2, a comparison of results from runs 1, 2 and 3 indicates that treating either the anion resin or the cation resin can improve the mixed bed separability; however, as seen in Run 4, only by treating both the anion and the cation resins was it possible to get perfect separability.

I claim:

1. A mixed bed ion exchange system comprising:
   a) a strong base quaternary ammonium anion exchange resin wherein said anion exchange resin has been treated with 10 to 800 milligrams of water-soluble sulfonated poly(vinylaromatic) polyelectrolyte per liter of anion exchange resin; wherein the number average molecular weight of the sulfonated poly(vinylaromatic) polyelectrolyte is from 5,000 to 1,000,000; and
   b) a strong acid sulfonated cation exchange resin wherein said cation exchange resin has been pretreated with 10 to 800 milligrams of a water-sulfonated cationic polyelectrolyte selected from the group of polymers consisting of poly(vinylaromatic) quaternary amine salts, poly(vinylaromatic) tertiary amine acid salts, or poly(vinylpyridines) acid salts, wherein the number average molecular weight of said polymers is from 5,000 to 1,000,000.

2. A mixed bed ion exchange system comprising:
   a) a strong base quaternary ammonium anion exchange resin wherein said anion exchange resin has been pretreated with 10 to 800 milligram of water-soluble sulfonated poly(vinylaromatic)polyelectrolyte per liter of anion exchange resin; wherein the number average molecular weight of the sulfonated poly(vinylaromatic) polyelectrolyte is from 5,000 to 1,000,000; and
   b) a strong acid sulfonated cation exchange resin wherein said cation exchange resin has been pretreated with 10 to 800 milligrams of a water-sulfonated cationic polyelectrolyte selected from the group of polymers consisting of poly(vinylaromatic)quaternary amine salts, poly(vinylaromatic)tertiary amine acid salts, or poly(vinylpyridines) acid salts; wherein the number average molecular weight of said polymers is from 5,000 to 1,000,000;
   c) further provided that said system is separable to the extent that 0-5% of either the cation or anion exchange resin or a mixture of both remains unseparated.

3. A method for preparing strong base anion exchange resins and strong acid cation exchange resins for use in mixed bed ion exchange systems containing strong base anion exchange resins and strong acid cations exchange resin comprising the steps of:
   (a) contacting said ion exchange resin with an effective amount of water-soluble sulfonated poly(vinylaromatic) polyelectrolyte wherein the amount of sulfonated poly(vinylaromatic)polyelectrolyte is from10 to 800 milligrams per per liter of anion exchange resin and the number average molecular weight of the sulfonated poly(vinylaromatic)polyelectrolyte is from 5,000 to 1,000, 000; and
   (b) contacting said cation exchange resin with an effective amount of a water-soluble cationic polyelectrolyte selected from the group of polymers consisting of poly(vinylaromatic)quaternary amine salts, poly(vinylaromatic) tertiary amine acid salts, or poly(vinylpyridines) acid salts; wherein the amount of polymer is from 10 to 800 milligram per liter of cation exchange resin and the number average molecular weight of said polymers is from 5,000 to 1,000,000, wherein said method provides a non-agglomerating, readily separable mixed bed ion exchange system.

4. A mixed bed ion exchange system according to claim 1, wherein said water soluble cationic polyelectrolyte is a poly (vinylpyridine) acid salt.

5. A mixed bed ion exchange system according to claim 2, wherein said water soluble cationic polyelectrolyte is a poly (vinylpyridine) acid salt.

* * * * *